June 11, 1963 L. H. BARRON 3,093,021
PORTABLE HOLE CUTTING WIRE-SAW MACHINE
Filed June 26, 1961 2 Sheets-Sheet 1

INVENTOR
LEE H. BARRON
BY
ATTORNEY

June 11, 1963  L. H. BARRON  3,093,021
PORTABLE HOLE CUTTING WIRE-SAW MACHINE

Filed June 26, 1961 2 Sheets-Sheet 2

INVENTOR
LEE H. BARRON
BY

ATTORNEY

United States Patent Office 3,093,021
Patented June 11, 1963

3,093,021
PORTABLE HOLE CUTTING WIRE-SAW MACHINE
Lee H. Barron, Glendale, Calif.
(4515 Alta Canyada Road, La Canada, Calif.)
Filed June 26, 1961, Ser. No. 119,580
4 Claims. (Cl. 83—201)

This invention relates to a portable wire-saw machine for cutting large holes in sheet material.

One object of the invention is to provide a portable wire-saw machine for cutting large holes in rigid or rigidly supported sheet material. Another object is to provide means in portable form for cutting large holes in rigid sheet material. Another object is to provide portable wire-saw means for cutting large holes in relatively thick, hard, tough, sheeted material such as natural or artificial stone.

These and other objects are attained by my invention, which will be understood from the following description, reference being made to the accompanying drawings in which.

Figure 1:
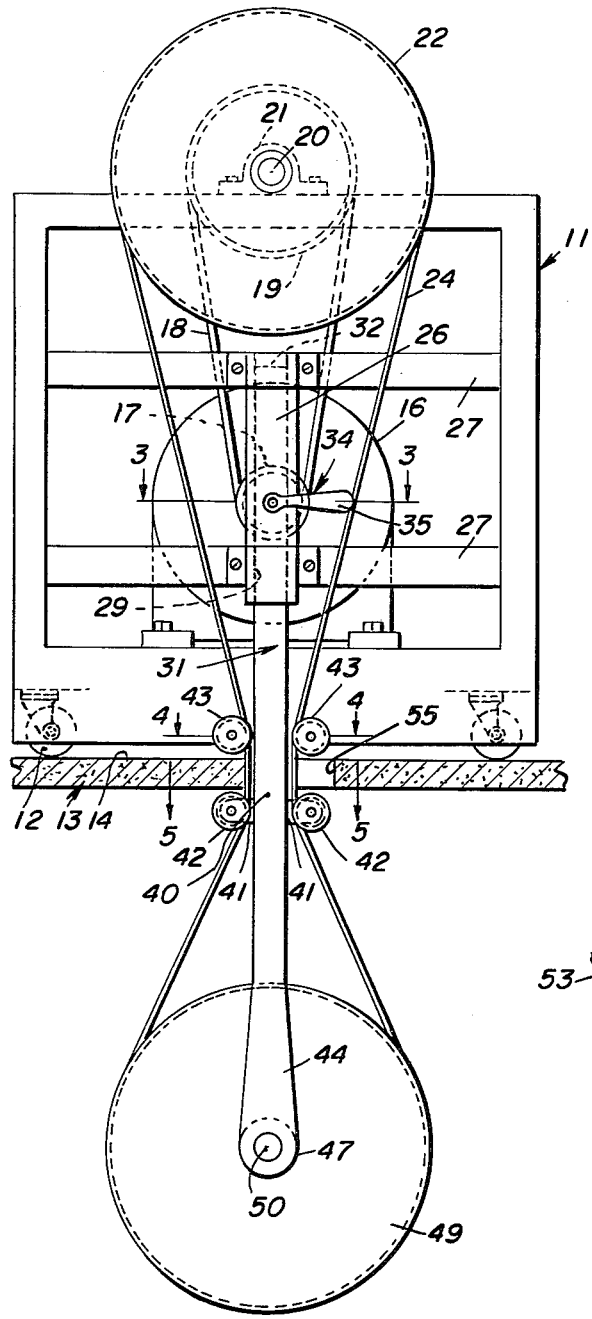
FIG. 1 is a front elevational view showing one form of my portable wire-saw.
Figure 2:
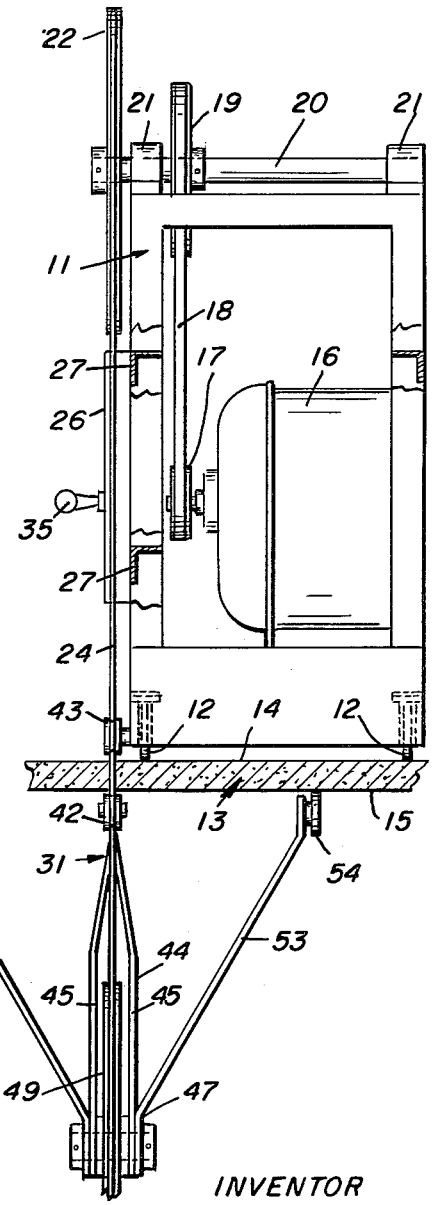
FIG. 2 is a side elevational view of the same.
Figure 3:
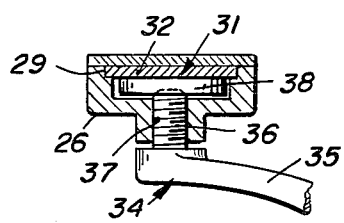
FIG. 3 is an enlarged fragmentary horizontal cross-sectional view taken as indicated by the line 3—3 of FIG. 1.
Figure 4:
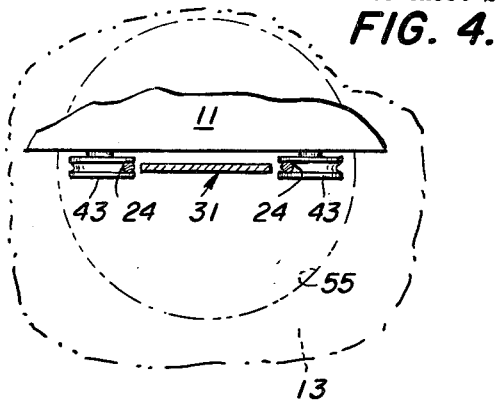
FIG. 4 is a fragmentary horizontal cross-sectional view taken from the position indicated by the line 4—4 of FIG. 1.
Figure 5:
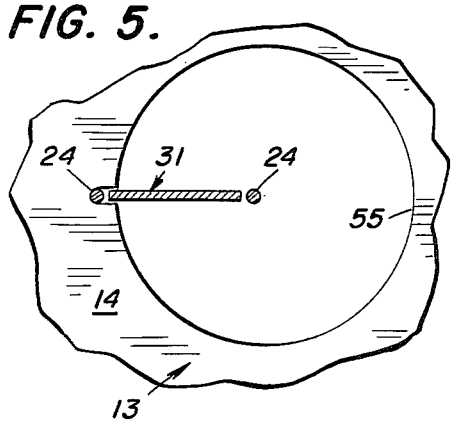
FIG. 5 is a fragmentary horizontal cross-sectional view taken from the position indicated by the line 5—5 of FIG. 1 and showing a typical cut of the saw in the work piece.
Figure 6:
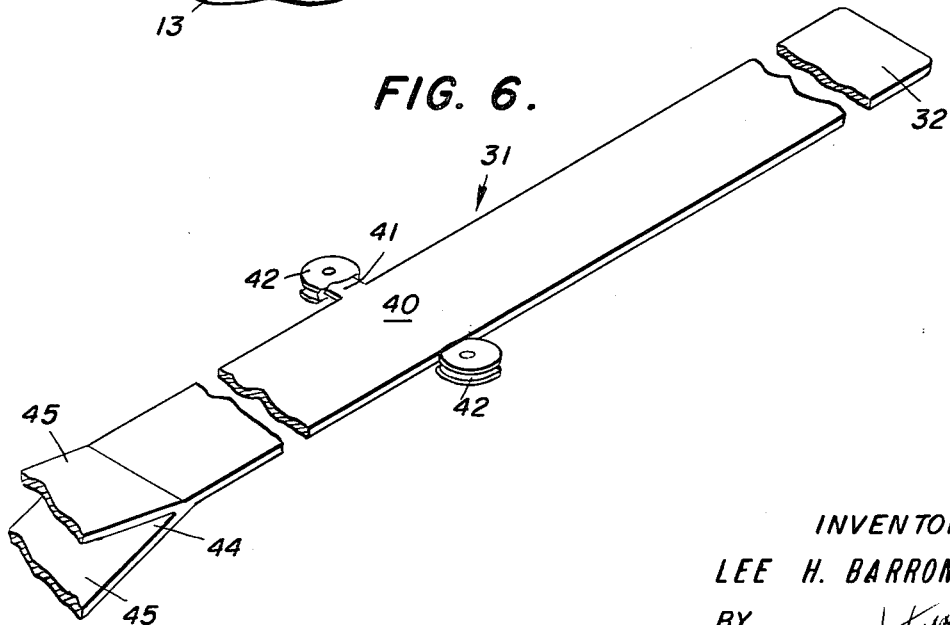
FIG. 6 is a fragmentary perspective view of the support bar.

Referring to the drawings, which show a preferred form of my invention, a frame 11 is provided with casters 12 at its four corners so that the frame and the elements supported thereby may be moved about as desired on the upper surface 14 of the work piece 13. The work piece is a self-supporting sheet of structural material such as natural or artificial stone, ceramics or aggregate material bonded by Portland cement or by a synthetic plastics bond. The work piece 13 is supported at its edges so that both sides of the sheet are accessible to the machine in the area in which a large hole is to be cut.

A motor 16 is mounted on the frame 11, the motor being provided with a drive sheave 17 which by means of the belt 18 drives the upper sheave 19 and attached shaft 20, which is mounted for rotation in the bearing blocks 21. A grooved upper pulley 22 on which the wire-saw 24 is operatively mounted, is also mounted on the shaft 20, and is rotated thereon.

Intermediate the upper pulley 22 and the upper surface 14 of the work piece 13, a vertically disposed channel member 26 is rigidly attached to intermediate cross members 27 of the frame 11, the channel member being aligned generally with the upper pulley 22. The channel member 26 is provided with a vertically disposed rectangular aperture 29, which aperture is adapted to receive a supporting stem 21 for a sub-assembly which extends below the work piece. The stem 31 consists of a thin strip of hardened alloy steel which is less in thickness than the diameter of the wire-saw 24, the width of the supporting strip being sufficient to give the necessary strength and rigidity to support the sub-assembly. For example, the stem 31 may be .090 inch thick, 1 inch wide, while the wire-saw may be 0.130 in diameter. The upper end 32 of the supporting stem 31 is arranged to fit closely in the aperture 29. A clamp means 34 is provided in the channel member, this clamp means as shown consisting of a handle 35 with a threaded shank 36 operating in a threaded hole 37 in the wall of the channel member 26, the end of the threaded shank 36 butting a pressure distributing pad 38 which presses against the face of the upper end 32 of the supporting stem 31 whereby to hold it securely in the aperture 29 at a selected elevation.

The middle portion 40 of the supporting stem 31 is provided with a pair of laterally extending tabs 41 upon which rubber faced rollers 42 are mounted.

The lower portion 44 of the supporting stem 31 is bifurcated into two legs 45 which are off-set and spread apart to form a stirrup support 47 for a lower pulley 49 which is arranged to rotate on the spindle 50 the ends of which are mounted in the lower ends of the legs 45. The grooved lower saw pulley 49 is aligned with the grooved upper saw pulley 22 so that the wire saw 24 moves in a plane defined by the groove of the upper and lower pulleys and the two pairs of rubber faced rollers 42 and 43. Optionally, bracing arms 53 may be attached to the ends of the spindle 50 of the lower saw pulley 49 and extend divergently upward toward the lower surface 15 of the work piece 13. The upper ends of the bracing arms 53 are provided with a roller 54 which abut the under surface 15 of the work piece, these functioning to give lateral support to the stirrup support 47 for the lower saw pulley 49.

The upper saw pulley 22, the lower saw pulley 49, and the rollers 42 and 43 are all grooved and provided with rubber working surfaces so that the wire saw is cushioned and does not abrade the pulleys and rollers.

In using my portable wire-saw device for cutting large holes in heavy sheeted structural material, a starting hole 55 is first drilled (by other suitable means). The starting hole 55 may be located at one corner, for example, of a rectangular piece to be cut out, the hole being only large enough to permit the insertion through it of the supporting stem 31. The wire-saw 24 which is formed into a continuous band, is placed over the upper saw pulley 22 and the depending lower loop is put through the hole 55. The sub-assembly mounted on the supporting stem 31 is then put into place from the under side of the work piece 13 through the starter hole 55, and the upper end 32 of the supporting stem 31 is inserted in the aperture 29, the lower loop of the wire-saw is then put in place over the lower saw pulley 49 and engaged in the four guide rollers 42 and 43, one pair 43 of these being disposed above the work piece and the other pair 42 below the work piece. The supporting stem 31 is then adjusted to the elevation in the aperture 29 to give the proper tension to the wire-saw 24, and the upper end 32 of the supporting stem is clamped by turning the handle 35 of the clamp means 34 to hold the sub-assembly in operative position on the frame 11. The wire saw 24 may then be moved in any direction as desired to cut the desired opening in the work piece. The saw cuts may be directed to other drilled holes. The machine as described is adapted particularly for making linear cuts or long radius curves.

When the sheet material is not strong enough to support the weight of the machine, it may be reinforced by a supporting other sheet which may be of material relatively easily cut by the wire saw.

The wire saw 24 is selected to cut a kerf wider than the thickness of the supporting stem 31, so that the stem may follow in the kerf. The wire saw may be spirally grooved alloy steel or it may, preferably, be a metal wire coated with diamonds embedded in an electro-deposited nickel bond.

My portable wire-saw device fills a need of the industry in cutting large openings in rigid structural materials of the kinds above described. The advantages of my invention will be apparent from the above description. The objectives set forth in the beginning have been attained.

I claim:
1. A portable wire saw machine comprising a frame which in operation is supported upon the upper surface of a self-supporting work sheet of material in which large holes are to be cut and which is freely movable over said surface wherever it may be required for effecting the cutting of said holes; a vertically disposed grooved upper saw pulley mounted in bearings on said frame; a lower pulley sub-assembly adapted to be positioned mainly below said sheet of material to be cut, said sub-assembly consisting of a supporting stem whose upper end is removably but rigidly attached to said frame and whose lower portion supports in operative position a lower saw pulley aligned with said upper saw pulley, and a pair of lower guide rollers extending from the edges of said supporting stem below said work sheet; a pair of upper guide rollers mounted on said frame above said work sheet and aligned respectively with said lower pair of guide rollers; means for removably fastening said supporting stem to said frame; and a continuous wire saw operatively positioned over said upper pulley, said lower pulley and said two pairs of guide rollers when said lower sub-assembly is attached by said supporting stem to said frame; said guide rollers directing the runs of said wire saw adjacent the opposite edges of said supporting stem, and said wire saw being selected in size to cut a kerf wider than the thickness of said stem measured in the direction parallel to the axes of said rollers.

2. A portable wire saw machine comprising a frame which in operation is supported on the upper surface of a self-supporting work sheet of material in which large holes are to be cut and which is freely movable over said surface wherever it may be required for effecting the cutting of said holes; a motor means mounted on said frame; a vertically disposed grooved saw pulley mounted in bearings on said frame; means associated with said motor for rotating said pulley; a vertically disposed channel member attached to said frame and aligned with said upper saw pulley, said channel member being apertured to receive a supporting stem of a lower pulley sub-assembly; a lower pulley sub-assembly which in operation is positioned mainly below said sheet of material to be cut, said assembly consisting of a supporting stem whose upper end is removably engaged in the aperture of said channel member, and whose lower portion supports in operative position a lower saw pulley aligned with said upper saw pulley, and a pair of guide rollers extending from the edges of said supporting stem, below said work sheet; a pair of upper guide rollers mounted on said frame above said work sheet and aligned respectively with said lower pair of guide rollers; means for removably fastening the upper end of said supporting stem in the aperture of said channel member; and a continuous wire saw operatively positioned over said upper pulley, said lower pulley and said two pairs of guide rollers when said lower sub-assembly is attached to said channel member; said guide rollers directing the runs of said wire saw adjacent the opposite edges of said supporting stem and said wire saw being selected in size to cut a kerf wider than the thickness of said stem measured in the direction parallel to the axes of said rollers.

3. The portable wire saw machine defined in claim 2 in which the lower portion of the supporting stem is bifurcated, each leg of said bifurcated stem being provided at its lower end portion with bearings for the lower saw pulley.

4. The portable wire saw machine defined in claim 2, in which angularly disposed diverging bracing arms extending from said lower pulley bearings are provided, extended upwardly and press upon the lower surface of said work sheet, whereby to prevent wobbling of said sub-assembly when the saw is in operation.

References Cited in the file of this patent

UNITED STATES PATENTS

| 340,964 | Thomas | Apr. 27, 1886 |
| 2,415,877 | Hajek | Feb. 18, 1947 |

FOREIGN PATENTS

| 6,650 | Great Britain | Apr. 30, 1890 |
| 425,125 | Germany | Feb. 11, 1926 |